United States Patent
Brizius

(10) Patent No.: US 9,410,088 B2
(45) Date of Patent: *Aug. 9, 2016

(54) PHOSPHONATE-SUBSTITUTED LIGNIN AS A FLAME RETARDANT

(71) Applicant: EMPIRE TECHNOLOGY DEVELOPMENT LLC, Wilmington, DE (US)

(72) Inventor: Glen Leon Brizius, Augusta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,393

(22) Filed: Sep. 8, 2014

(65) Prior Publication Data

US 2014/0378671 A1 Dec. 25, 2014

Related U.S. Application Data

(60) Continuation of application No. 14/260,835, filed on Apr. 24, 2014, now Pat. No. 8,852,468, which is a division of application No. 13/577,382, filed as application No. PCT/US2012/036291 on May 3, 2012, now Pat. No. 8,747,709.

(51) Int. Cl.
| | | |
|---|---|---|
| *C09K 21/12* | (2006.01) | |
| *C09K 21/14* | (2006.01) | |
| *C08H 6/00* | (2010.01) | |
| *D21H 11/20* | (2006.01) | |
| *C09D 5/18* | (2006.01) | |
| *D21C 9/00* | (2006.01) | |
| *C08H 7/00* | (2011.01) | |
| *C08L 55/02* | (2006.01) | |
| *C08L 77/00* | (2006.01) | |

(52) U.S. Cl.
CPC ........ *C09K 21/14* (2013.01); *C08H 6/00* (2013.01); *C08L 55/02* (2013.01); *C08L 77/00* (2013.01); *C09K 21/12* (2013.01); *Y10T 428/31507* (2015.04); *Y10T 428/31511* (2015.04); *Y10T 428/31786* (2015.04); *Y10T 428/31935* (2015.04); *Y10T 428/31971* (2015.04); *Y10T 442/3984* (2015.04); *Y10T 442/696* (2015.04)

(58) Field of Classification Search
None
See application file for complete search history.

(56) References Cited

U.S. PATENT DOCUMENTS

| | | | | |
|---|---|---|---|---|
| 2,851,355 | A * | 9/1958 | Heinz Haas et al. | 162/80 |
| 2,994,620 | A * | 8/1961 | Franck et al. | 427/343 |
| 3,072,534 | A | 1/1963 | Roth et al. | |
| 3,081,293 | A * | 3/1963 | Doughty | 530/506 |
| 3,092,537 | A * | 6/1963 | Brandts | 162/159 |

(Continued)

FOREIGN PATENT DOCUMENTS

| | | |
|---|---|---|
| AU | 5153979 A | 4/1980 |
| CA | 654728 | 12/1962 |

(Continued)

OTHER PUBLICATIONS

International Search Report and Written Opinion for PCT/US2012/036291 dated Jun. 7, 2012.

(Continued)

*Primary Examiner* — Joseph D Anthony
(74) *Attorney, Agent, or Firm* — Pepper Hamilton LLP

(57) ABSTRACT

Modified lignin having covalently attached phosphorous containing groups and methods for preparing such compounds are described herein. The modified lignin described herein provides a renewable source of flame retardant material.

25 Claims, 1 Drawing Sheet

(56) References Cited

U.S. PATENT DOCUMENTS

| | | | |
|---|---|---|---|
| 3,371,058 A * | 2/1968 | Perizzolo | 524/415 |
| 3,398,019 A | 8/1968 | Langguth et al. | |
| 3,459,588 A * | 8/1969 | Davis | 442/144 |
| 3,811,992 A * | 5/1974 | Handa et al. | 428/447 |
| 3,822,225 A | 7/1974 | Braddon et al. | |
| 3,915,911 A | 10/1975 | Horiguchi | |
| 3,948,801 A | 4/1976 | Braddon et al. | |
| 4,115,422 A | 9/1978 | Welch et al. | |
| 4,134,786 A | 1/1979 | Humphrey | |
| 4,230,822 A | 10/1980 | Murch et al. | |
| 4,288,489 A | 9/1981 | Nachbur et al. | |
| 4,654,277 A | 3/1987 | MacWilliams et al. | |
| 4,759,872 A | 7/1988 | Marx et al. | |
| 4,925,923 A * | 5/1990 | Yalpani et al. | 530/506 |
| 4,988,576 A | 1/1991 | Lin et al. | |
| 5,104,649 A | 4/1992 | Jansson et al. | |
| 5,162,394 A * | 11/1992 | Trocino et al. | 523/208 |
| 5,246,739 A | 9/1993 | Lin | |
| 5,750,201 A * | 5/1998 | Phanopoulos et al. | 427/375 |
| 5,788,915 A | 8/1998 | Blount | |
| 5,854,309 A | 12/1998 | Blount | |
| 5,874,025 A | 2/1999 | Heuer et al. | |
| 5,968,599 A | 10/1999 | Jung et al. | |
| 5,985,301 A | 11/1999 | Nakamura et al. | |
| 6,124,221 A | 9/2000 | Gabbay | |
| 6,231,651 B1 | 5/2001 | Schultz et al. | |
| 6,258,298 B1 | 7/2001 | Blount | |
| 6,270,694 B1 | 8/2001 | Blount | |
| 6,274,519 B1 | 8/2001 | Omori et al. | |
| 6,348,526 B1 | 2/2002 | Blount | |
| 6,423,250 B1 | 7/2002 | Blount | |
| 6,423,251 B1 | 7/2002 | Blount | |
| 6,444,718 B1 | 9/2002 | Blount | |
| 6,464,903 B1 | 10/2002 | Blount | |
| 6,491,850 B1 | 12/2002 | Blount | |
| 6,495,655 B2 | 12/2002 | Blount | |
| 6,777,469 B2 | 8/2004 | Blount | |
| 7,129,291 B2 | 10/2006 | Blount | |
| 8,974,854 B2 | 3/2015 | Leach et al. | |
| 2002/0158237 A1 | 10/2002 | Blount | |
| 2002/0173565 A1 | 11/2002 | Blount | |
| 2003/0020054 A1 | 1/2003 | Blount | |
| 2003/0022959 A1 | 1/2003 | Blount | |
| 2003/0134971 A1 | 7/2003 | Blount | |
| 2004/0082712 A1 | 4/2004 | Blount | |
| 2004/0089196 A1 | 5/2004 | Anderson et al. | |
| 2004/0244448 A1 | 12/2004 | Blount | |
| 2005/0019363 A1 | 1/2005 | Blount | |
| 2005/0130841 A1 | 6/2005 | Blount | |
| 2005/0166652 A1 | 8/2005 | Blount | |
| 2006/0183821 A1 | 8/2006 | Kaspers et al. | |
| 2008/0265222 A1 | 10/2008 | Ozersky et al. | |
| 2013/0292615 A1 | 11/2013 | Brizius | |

FOREIGN PATENT DOCUMENTS

| | | |
|---|---|---|
| DE | 2436166 A1 | 2/1975 |
| DE | 2940749 A1 | 4/1980 |
| EP | 042075 B1 | 2/1984 |
| FR | 2239511 A1 | 2/1975 |
| FR | 2438667 A1 | 5/1980 |
| GB | 1417370 A | 12/1975 |
| GB | 2034720 A | 6/1980 |
| JP | 55094925 A | 7/1980 |
| JP | 1308432 A | 12/1989 |
| NO | 885397 A | 6/1989 |
| NZ | 191785 A | 6/1982 |
| SE | 8804343 A | 11/1988 |
| ZA | 7905351 | 10/1980 |

OTHER PUBLICATIONS

Alaee et al., An overview of commercially used brominated flame retardants, their applications, their use patterns in different countries/regions and possible modes of release, *Environmental International* (2003), 29:683-689.

Alexy et al., The effect of blending lignin with polyethylene and polypropylene on physical properties, *Polymer* (2000), 41:4901-4908.

Banks et al., Influence of covalently bound phosphorus-containing groups on the flammability of poly(vinyl alcohol), poly(ethylene-co-vinyl alcohol) and low density polyethylene, *Polymer* (Nov. 1993), 34(21):4547-4556 (Abstract).

Banks et al., The flame-retardant effect of diethyl vinyl phosphonate in copolymers with styrene, methyl methacrylate, acrylonitrile and acrylamide, Polymer (Aug. 1994), 35(16):3470-3473 (Abstract).

Biofuels Basics, http://www.nrel.gov/learning/re_biofuels.html [Printed from Internet Jul. 27, 2012].

Biorefineries, Bioenergy and Energy Planning Research Group BPE, Techno-economical and environmental evaluation of lignocellulosic biorefineries, http://bpe.epfl.ch/page34016-en.html [Printed from Internet Jul. 27, 2012].

Birnbaum et al., Brominated Flame Retardants: Cause for Concern?, *Environmental Health Perspectives* (Jan. 2004), 112(1):9-17.

Braun et al., Flame Retardant Mechanisms of Red Phosphorus and Magnesium Hydroxide in High Impact Polystyrene, *Macromolecular Chemistry and Physics* (Oct. 26, 2004), 205(16):2185-2196 (Abstract).

Bringezu et al., Assessing Biofuels, International Panel for Sustainable Resource Management, accessed at http://www.unep.org/resourcepanel/Portals/24102/PDFs/Assessing_Biofuels_Summary.pdf, pp. 1-40, accessed on Oct. 23, 2013.

Bringezu et al., Towards sustainable production and use of resources: Assessing Biofuels, International Panel for Sustainable Resource Management, United Nations Environment Programme, (2009).

Brominated Flame Retardants in the Environment, U.S. Department of the Interior, U.S. Geological Survey, (Nov. 2004).

Burge et al., Occupational asthma due to formaldehyde, *Thorax* (1985), 40:255-260.

Business Wire, New Principia Study Projects $6.3 Billion Market in 2012 for North American Residential and Commercial Building Insulation http://www.businesswire.com/news/home/20110208005908/en.Principia-Study-Projects [Printed from Internet Jul. 27, 2012].

Carty et al., Flame-retardancy and Smoke-suppression Studies on Ferrocene Derivatives in PVC, *Applied Organometallic Chemistry* (Mar. 1996), 10(2):101-111 (Abstract).

Cateto et al., Polyurethanes as a Viable route to Volorise Lignin, XXI Encontro Nacional da Tecnicelpa / VI Ciadicyp (Oct. 12-15, 2010), Lisboa, Portugal.

Crude Oil Price, http://www.oil-price.net [Printed from Internet Jul. 27, 2012].

Cullis et al., Metal chelates as flame retardants and smoke suppressants for thermoplastic polymers, *European Polymer Journal* (1984), 20(7): 707-711 (Abstract).

Darnerud, Toxic effects of brominated flame retardants in man and in wildfire, *Environmental International* (2003), 29:841-853.

De Chirico et al., Flame retardants for polypropylene based on lignin, *Polymer Degradation and Stability* (Nov. 2, 2002), 79(1):139-145 (Abstract).

De Wit, An overview of brominated flame retardants in the environment, *Chemosphere* (Feb. 2002), 46(5):583-624 (Abstract).

Deepwater Horizon Oil Spill, http://en.wikipedia.org/wiki/Deepwater_Horizon_oil_spill [Printed from Internet Jul. 27, 2012].

Ding et al., Preparation and characterization of flame retardant epoxy resins based on phosphorus-containing biphenyl-type phenolic resin, *E-Polymers Journal* (Nov. 11, 2010) (Abstract).

Electrospinning http://en.wikipedia.org/wiki/Electrospinning [Printed from Internet Jul. 27, 2012].

Energy Savers: Polyurethane Insulation Materials, http://www.energysavers.gov/your_home/insulation_airsealing/index/cfm/mytopic [Printed from Internet Jul. 27, 2012].

Falkehag, Lignin in Materials, *Applied Polymer Simposium* (1975), 28:247-257.

(56) References Cited

OTHER PUBLICATIONS

Feldman et al., Lignin and Its Polyblends, *J.M.S.-Pure Appl. Chem.* (1995), A32(8-9):1613-1619.
Feldman et al., Polyurethane Maleic Anhydride Grafted Lignin Polyblends, *Cellulose Chem. Technol.* (1991), 25:163-180.
Feldman et al., Structure-properties relations of thermally cured epoxy-lignin polyblends, *Journal of Applied Polymer Science* (Mar. 20, 1991), 42(6):1537-1550 (Abstract).
Formaldehyde and Cancer Risk: Fact Sheet, National Cancer Institute http://www.cancer.gov/cancertopics/factsheet/Risk/formaldehyde [Printed from Internet Jul. 27, 2012].
Freshwater Spills Symposia http://www.epa.gov/emergencies/contents/fss/index.htm [Printed from Internet Jul. 27, 2012].
Granzow, Flame retardation by phosphorus compounds, *Acc. Chem. Res.* (May 1978), 11(5):177-183 (Abstract).
Green, A Review of Phosphorus-Containing Flame Retardants, *Journal of Fire Sciences* (Nov.-Dec. 1992), 10:470-487.
Guevarra, JCI's Global Study Finds Rising Energy Costs Drive Green Growth, accessed at http://www.greenbiz.com/news/2011/06/16/jci-global-study-finds-rising-energy-costs-drive-green-growth, pp. 1-2 (Jun. 16, 2011).
Guo et al., Polyesters from Lignin. 1. The reaction of kraft lignin with dicarboxylic acid chlorides, *Polymer International* (1992), 27(1):17-22 (Abstract).
Guo et al., Polyesters from lignin—2. The copolyesterification of kraft lignin and polyethylene glycols with dicarboxylic acid chlorides, *European Polymer Journal* (1991), 27(11):1177-1180 (Abstract).
Hatakeyama et al., Biodegradable Polyurethanes from Plant Components, *Journal of Macromolecular Science, Part A: Pure and Applied Chemistry* (1995), 32(4):743-750 (Abstract).
Hirose et al., Heat-Resistant Polyurethanes from Solvolysis Lignin, *Lignin* (Jul. 31, 1989), 29:382-389 (Abstract).
Holladay et al., Top Value-Added Chemicals from Biomass: vol. II—Results of Screening for Potential Candidates from Biorefinery Lignin, Pacific Northwest National Laboratory (Oct. 2007).
Hsu et al., Polyurethane foams from carboxylated lignins, *J. Appl. Polym. Sci. Appl. Polym. Symp*, (1975), 28:297-307.
Insulation Fact Sheet: Insulating a New House (Do It Right the First Time), Department of Energy http://www.ornl.gov/sci/roofs+walls/insulation/ins_05.html [Printed from Internet Jul. 27, 2012].
Kharade et al., Lignin-filled polyolefins, *Journal of Applied Polymer Science* (Mar. 23, 1999), 72(10):1321-1326 (Abstract).
Khasbaatar et al., Synthesis and thermal study on viscose rayon succinate coupled with metals and viscose rayon succinic silane, *J. Ind. Eng. Chem.* (2007) 13(7):1109-1116.
Kovrizhnykh, Hydroxymethylation of lignosulfonates for synthesis of lignin—urea-formaldehyde resins, *Russ J Appl Chem* (1998), 71(3):510-513.
Levchik, A Review of Recent Progress in Phosphorus-based Flame Retardants, *Journal of Fire Sciences* (Sep. 2006), 24:345-364.
Li et al., Thermal and mechanical properties of biodegradable blends of poly(L-lactic acid) and lignin, *Polymer International* (May 12, 2003), 52(6):949-955 (Abstract).
Lora et al., Recent Industrial Applications of Lignin: A Sustainable Alternative to Nonrenewable Materials, *Journal of Polymers and the Environment* (2002), 10(102):39-48 (Abstract).
Market Transformation Programme, BNIW02: Insulation waste management, Version 1.0, www.mtprog.com (Mar. 23, 2007), pp. 1-11.
McCarthy et al., Lignin Chemistry, Technology and Utilization: A Brief History, *American Chemical Society* (Nov. 30, 1999), pp. 2-99.
McDonald, A perspective on the potential health risks of PBDEs, *Chemosphere* (2002), 46:745-755.
McPherson et al., Brominated Flame Retardants in Dust on Computers: The Case for Safer Chemicals and Better Computer Design, www.computertakeback.org (Jun. 2004).
Mörck et al., Elastomeric Polyurethanes from a Kraft Lignin-Polyethylene Glycol-Toluene Diisocyanate System, *Lignin* (Jul. 31, 1989), 30:390-401 (Abstract).

Nakano et al., Thermal and mechanical properties of polyurethanes derived from fractionated kraft lignin, *Sen 'I Gakkaishi* (1997), 53(10):416-422 (Abstract).
Nonaka et al., Synthesis of lignin/epoxy resins in aqueous systems and their properties, *Holzforschung* (1997), 51(2):183-187.
Nriagu, Legacy of mercury pollution, *Nature* (Jun. 17, 1993), 363:589 (Abstract).
Overall Fire Statistics, National Fire Protection Association, The authority on fire, electrical and building safety, http://www.nfpa.org/categoryList.asp?categoryID=413&URL=Research/Fire [Printed from Internet Jul. 27, 2012].
Paauw et al., Some filler effects on cross-linking of unsaturated polyesters, *Journal of Applied Polymer Science* (Mar. 10, 2003), 50&7):1287-1293 (Abstract).
Peak Oil http://www.peakoil.net [Printed from Internet Jul. 27, 2012].
Perlack et al., U.S. Department of Energy, Biomass as Feedstock for a Bioenergy and Bioproducts Industry: The Technical Feasibility of a Billion-Ton Annual Supply (Apr. 2005).
Perry, Concerns raised about coastal levels of flame-retardant chemicals, *Los Angels Times* (Apr. 1, 2009), http://articles.latimes.com/print/2009/apr/01/localime-flame-retardants1.
Price et al., Thermal behavior of covalently bonded phosphonate and phosphonate flame retardant polystyrene systems, *Polymer Degradation and Stability* (Feb. 20, 2007), 92(6):1101-1114 (Abstract).
Pryolysis Chemistry: Difficulties http://blogs.princeton.edu/chm333/f2006/biomass/2007/01/pryrolysis_chemistry.html [Printed from Internet Jul. 27, 2012].
Reimann et al., Kraft lignin in polyurethanes III. Effects of the molecular weight of PEG on the properties of polyurethanes from a kraft lignin-PEG-MDI system, *Journal of Applied Polymer Science* (1990), 41(1-2):39-50 (Abstract).
Rodrigues et al., Polyaniline/lignin blends: thermal analysis and XPS, *European Polymer Journal* (2001), 37:2217-2223.
Roffael et al., Lignin and ligninsulfonate in non-conventional bonding—an overview, *European Journal of Wood and Wood Products* (1991), 49(5):199-205 (Abstract).
Saraf et al., Engineering plastics from lignin. III. Structure property relationships in solution cast polyurethane films, *Journal of Applied Polymer Science* (May 1984), 29(5):1831-1841 (Abstract).
Selid et al., Sensing Mercury for Biomedical and Environmental Monitoring, *Sensors* (Jul. 9, 2009), 9:5446-5459.
Setua et al., Lignin reinforced rubber composites, *Polymer Composites* (Dec. 2000), 21(6):988-995 (Abstract).
Stevens et al., The structure-activity relationship of fire retardant phosphorus compounds in wood, *Polymer Degradation and Stability* (Aug. 18, 2005), 91(4):832-841 (Abstract).
Thielemans et al., Kraft Lignin as Fiber Treatment and Compatibilizer for Natural Fiber Reinforced Composites, University of Delaware, Department of Chemical Engineering, prepared and presented at AIChE Annual Conference, Nov. 2003.
Thielemans et al., Lignin Esters for Use in Unsaturated Thermosets: Lignin Modification and Solubility Modeling, *Biomacromolecules* (Jun. 7, 2005), 6(4):1895-1905 (Abstract).
Thielemans et al., Novel applications of lignin in composite materials, *Journal of Applied Polymer Science* (Nov. 6, 2001), 83(2):323-331 (Abstract).
Toriz et al., Lignin-polypropylene composites. Part 1: composites from unmodified lignin and polypropylene, *Polymer Composites* (Oct. 2002), 23(5):806-813 (Abstract).
Toxicological Profile for Polybrominated Biphenyls and Polybrominated Diphenyl Ethers, Agency for Toxic Substances and Diseases Registry (ATSDR), pp. 619, Sep. 2004.
Urea-formaldehyde, http://en.wikipedia.org/wild/Urea-formaldehyde [Printed from Internet Jul. 27, 2012].
Weil et al., Flame Retardants in Commercial Use or Development for Textiles, *Journal of Fire Sciences* (May 2008), 26(3):243-281 (Abstract).
Yoshida et al., Kraft lignin in polyurethanes I. Mechanical properties of polyurethanes from a kraft lignin-polyether triol-polymeric MDI system, *Journal of Applied Polymer Science* (Aug. 20, 1987), 34(3):1187-1198 (Abstract).

(56) References Cited

OTHER PUBLICATIONS

Yoshida et al., Kraft lignin in polyurethanes. II. Effects of the molecular weight of kraft lignin on the properties of polyurethanes from a kraft lignin-polyether triol-polymeric MDI system, *Journal of Applied Polymer Science* (Dec. 5-20, 1990), 40(11-12):1819-1832 (Abstract).

Yu et al., Functionalized lignin by grafting phosphorus-nitrogen improves the thermal stability and flame retardancy of polypropylene, *Polymer Degradation and Stability* (Jan. 24, 2012), 97(4):541-546 (Abstract).

Akhlaghinia et al., A new convenient Method of Generating Alkyl Isocyanates from Alcohols, Thiols, and Trimethylsilyl Ethers Using a 2,4,6Trichloro[1,3,5]triazine/n-Bu4NOCN, *Turkish Journal of Chemistry* (2007), 31(1):35-43.

Biocides, accessed at https://web.archive.org/web/20120428000848/http://www.lenntech.com/biocides.htm,.accessed on Apr. 4, 2015, pp. 1-2.

Cholera Vaccines. A brief summary of the Mar. 2010 position paper, accessed at https://web.archive.org/web/20141228125225/http://www.who.int/immunization/Cholera_PP_Accomp_letter_Mar_10_2010.pdf, accessed on Apr. 4, 2015, p. 1.

Cox, Glyphosate, *Journal of Pesticide Reform* (1991), 11(2):35-38.

Dankovich et al., Bactericidal Paper Impregnated With Silver Na-Noparticles for Point-Of-Use Water Treatment, *Environmental Science and Technology* (Feb. 11, 2011), 45(5,):1992-1998.

FEMA: Formaldehyde and Travel Trailers, accessed at https://web.archive.org/web/20110908033357/http://www.fema.gov/news/newsrelease.fema?id =36730, posted on Jul. 20, 2007, pp. 1-3.

Fiberglass, accessed at https://web.archive.org/web/20120406155721/http ://en.wikipedia.org/wiki/Fiberglass, last modified on Mar. 28, 2012, pp. 1-9.

Freeman et al., Past, Present, and Future of the Wood Preservation Industry, *Forest Products Journal* (Oct. 2003), 53(10):8-15.

Graf, Benzalkonium chloride as a preservative in nasal solutions: re-examining the data, *Respiratory Medicine* (Sep. 2001), 95(9):728-733.

Isocyanates, TheZenith, Risk Management Bulletin, RM117, accessed at https://web.archive.org/web/20101226063907/http://thezenith.com/employers/services/pi/indsaf /gensaftips/rmbs/general_isocyanates_rm117.pdf, accessed on Apr. 3, 2015, pp. 1-3.

Kochian, Phytoremediation: Using Plants to Clean Up Soils, accessed at https://web.archive.org/web/20120427060325/http://www.ars.usda.gov/is/AR/archive/jun00/soil0600.htm, last modified on Aug. 13, 2004, pp. 1-7.

Material Safety Data Sheet Dimethyl carbonate MSDS, accessed at https://web.archive.org/web/20120806220504/http://www.sciencelab.com/msds.php?msdsId=9923808, accessed on Apr. 4, 2015, pp. 1-55.

Material Safety Data Sheet Dimethyl sulfate MSDS, accessed at https://web.archive.org/web/20140202114142/http://www.sciencelab.com/msds.php?msdsId=9927524, accessed on Apr. 4, 2015, pp. 1-6.

Material Safety Data Sheet Methyl iodide MSDS, accessed at https://web.archive.org/web/20131007081057/http://www.sciencelab.com/msds.php?msdsId=9927669, accessed on Apr. 4, 2015, pp. 1-6.

OAR Policy and Guidance Information, accessed at https://web.archive.org/web/20120418002944/http://www.epa.gov/ttn/oarpg, accessed on Apr. 3, 2015, p. 1.

Problems With Wood, accessed at https://web.archive.org/web/20120106175627/http://www.active-serivices.org.uk/problemswithwood.html, accessed on Apr. 3, 2015, pp. 1-3.

Selva et al., Highly Chemoselective Methylation and Esterification Reactions with Dimethyl Carbonate in the Presence of NaY Faujasite. The Case of Mercaptophenols, Mercaptobenzoic Acids, and Carboxylic Acids Bearing OH Substituents, *The Journal of Organic Chemistry* (Jan. 25, 2006), 71(4):1464-1470.

The US Wood Preservative Chemicals Market to Reach US$567.4 Million, According to a New Report by Global Industry Analysts, Inc., accessed at http://www.prweb.com/releases/wood_preservative/chemicals_creosote/prweb8070263.htm, posted on Jan. 18, 2011, pp. 1-2.

Tundo et al., The Chemistry of Dimethyl Carbonate, *Accounts of Chemical Research* (Jun. 5, 2002), 35(9):706-716.

Wormell, Chromated Copper Arsenate (CCA), accessed at https://web.archive.org/web/20120320180029/http://www.epa.gov/oppad001/reregistration/cca/, posted on Jul. 2011 , pp. 1-4.

Zhou et al., Preparation and Characteristics of a New Antibacterial Cotton Fiber Bonding a Gemini-type Quaternary Ammonium Salt, *Journal of Fiber Bioengineering and Informatics* (2008),1(2):165-172.

* cited by examiner

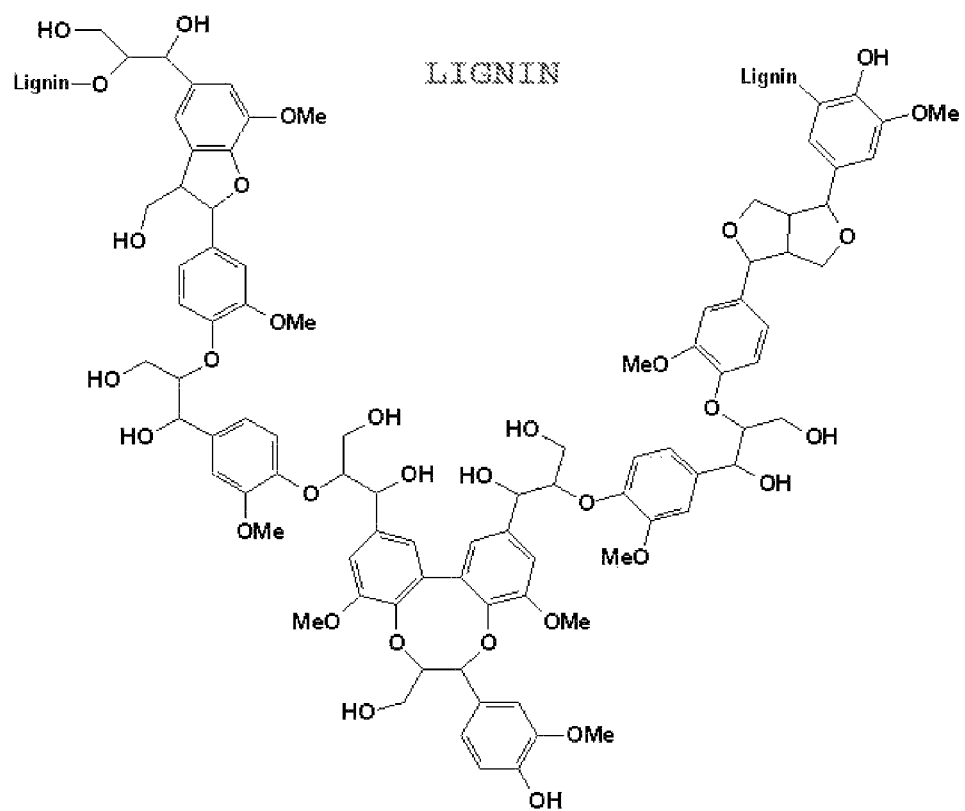

PHOSPHONATE-SUBSTITUTED LIGNIN AS A FLAME RETARDANT

CLAIM OF PRIORITY

This application is a continuation application of and claims priority to U.S. patent application Ser. No. 14/260,835, filed Apr. 24, 2014, now U.S. Pat. No. 8,852,468, and entitled "Phosphonate-Substituted Lignin as a Flame Retardant," which is a divisional of and claims priority to U.S. patent application Ser. No. 13/577,382, filed Aug. 6, 2012, now U.S. Pat. No. 8,747,709, and entitled "Phosphonate-Substituted Lignin as a Flame Retardant," which is a U.S. national stage filing under 35 U.S.C. §371 of International Application No. PCT/US2012/036291 filed May 3, 2012, also entitled "Phosphonate-Substituted Lignin As A Flame Retardant," the disclosures of which are incorporated by reference in their entirety.

SUMMARY

Various embodiments are directed to flame retardants including lignin and a phosphorous containing component covalently attached to the lignin. In some embodiments, the phosphorous containing component can be two or more of phosphine, phosphine oxide, phosphinite, phosphonite, phosphinate, phosphonate, phosphate, or combinations thereof.

Other embodiments are directed to methods for producing flame retardants. Such methods generally include the steps of providing a lignin having free hydroxyl groups in a solvent, contacting the lignin and a phosphorous containing compound to provide a reaction mixture, and introducing a catalyst into the reaction mixture. In such embodiments, the lignin can react with the phosphorous containing compound to replace one or more free hydroxyl groups on the lignin with a phosphorous containing compound to produce the flame retardant.

Further embodiments are directed to articles of manufacture including flame retardants including a lignin and a phosphorous containing component covalently attached to the lignin such as those described above.

BRIEF DESCRIPTION OF THE FIGURES

In the following detailed description, reference is made to the accompanying drawings, which form a part hereof. In the drawings, similar symbols typically identify similar components unless context dictates otherwise. The illustrative embodiments described in the detailed description, drawings, and claims are not meant to be limiting. Other embodiments may be utilized and other changes may be made, without departing from the spirit or scope of the subject matter presented herein. It will be readily understood that the aspects of the present disclosure, as generally described herein and illustrated in the FIGURES, can be arranged, substituted, combined, separated, and designed in a wide variety of different configurations, all of which are explicitly contemplated herein.

FIG. 1. Generic structure of typical lignin substructure.

DETAILED DESCRIPTION

Lignin, FIG. 1, is a large natural polymer containing numerous aromatic moieties and plentiful hydroxyl groups, extensively cross linked by ether bonds. It is the second most abundant polymer on the planet after cellulose and the most abundant non-petroleum source of aromatic compounds. Lignin is found in the cell walls of all vascular plants and can make up between 20% and 40% of the content of these plants and acts as a water transport system throughout the cell wall. Lignin also bonds plant cells together, giving plant stems rigidity and providing most of the material strength of the plant. Although lignin shows great promise as a starting material for chemical synthesis, its heavily cross-linked nature makes it difficult to process. Therefore, lignin has historically been either burned for energy or used as fillers in low margin, low value niche applications. Hydroxyl groups (—OH) associated with lignin can serve as a pathway for attaching groups that change the properties of lignin, giving the material additional and desirable properties.

Like most organic materials, the oxygen-rich lignin burns when exposed to flame, and the addition of flame retardant additives has not allowed these materials to meet fire retardant standards for residential or commercial use. This invention proposes a novel flame retardant lignin having the unique chemistry of naturally occurring lignin that is carefully manipulated to make it flame resistant. This material can be blended as filler into polymers, transferring the flame resistant properties into those materials or electrospun into fibers for use as thermal insulation.

Embodiments of the invention are directed to modified lignin, methods for producing such modified lignin, and articles of manufacture including the modified lignin. The modified lignin of various embodiments include, for example, introducing phosphorous containing groups onto the lignin through free hydroxyl groups thereby augmenting the inherit properties of lignin by making the lignin more flame resistant. The modified lignin provides a materially tough, cheap, and flame resistant material that can be used, for example, in thermal insulation or as polymer additives. For example, the modified lignin of embodiments can be incorporated into building insulation or used as a filler material in thermosets, thermoplastics, and rubbers and as a reactant in the formation of epoxy-resins, polyurethanes, phenol-formaldehyde resins, and polyesters.

Lignin includes a variety of functional groups associated with the aromatic backbone (see, FIG. 1) including, for example, carboxylic acids, ketones, hydroxyls, and the like. In some embodiments, these functional groups can be used to attach various pendant groups to the lignin. While embodiments are not limited to a particular type of pendant group, in some embodiments, the pendant groups may include one or more phosphorous atoms to provide lignin molecules having one or more phosphorous containing pendant groups. Any pendant group containing a phosphorous may be used in embodiments. For example, in some embodiments, the phosphorous containing component of a modified lignin can be a phosphine, phosphine oxide, phosphinite, phosphonite, phosphinate, phosphonate, phosphate, or combinations thereof. Such phosphorous containing components can be substituted or unsubstituted and when substituted can include any substituent including, for example, one or more $C_1$ to $C_{18}$ alkyl, $C_2$ to $C_{18}$ alkenyl, $C_2$ to $C_{18}$ alkynyl, $C_5$ to $C_{20}$ cycloalkyl, $C_5$ to $C_{20}$ aryl, or combinations thereof.

In particular embodiments, the phosphorous containing component may include a compound of general formula:

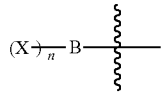

where B can be a $C_1$ to $C_{18}$ alkyl, $C_2$ to $C_{18}$ alkenyl, $C_2$ to $C_{18}$ alkynyl, $C_5$ to $C_{20}$ cycloalkyl, or $C_5$ to $C_{20}$ aryl, each X can, independently, be a phosphorous containing substituent, and n is an integer of 2 to 8.

B is not limited, but in various embodiments is a cyclic, bicyclic, aromatic, heteroaromatic, poly-aromatic compound. For example, in some embodiments, B can be cyclopentyl, cyclohexyl, cyclooctyl, cyclodecyl, cyclopentyl-diene, benzyl, naphthyl, indenyl, or combinations thereof, and in certain embodiments, B can be benzyl. The B of the phosphorous containing component may include any number (n) of phosphorous containing substituents (X), and the number of substituents will vary depending on the number of carbon atoms in each B. For example, in various embodiments, n can be 2, 3, 4, 5, 6, 7, or 8, and in further embodiments, in which B is a poly-aromatic compound n may be greater than 8. For example, n may be 9, 10, 11, 12, 14, or 16.

Each X in an individual phosphorous containing compound as presented in the general formula above may be the same or different, and X can be any phosphorous containing substituent known in the art. For example, in some embodiments, each X may, independently, be a phosphine, phosphine oxide, phosphinite, phosphonite, phosphinate, phosphonate, or phosphate. In addition, each X may, independently, include additional substituents at one or more positions. "Substituent," as used herein, refers to a molecular group that replaces a hydrogen in a hydrocarbon. The number and type of substituents associated with X are not limited. In certain embodiments, substituents associated with X can include, but are not limited to, trifluoromethyl, nitro, cyano, $C_1$-$C_{20}$ alkyl, aromatic or aryl, halide (F, Cl, Br, I), $C_1$-$C_{20}$ alkyl ether, $C_1$-$C_{20}$ alkyl ester, benzyl halide, benzyl ether, aromatic or aryl ether, hydroxy, alkoxy, amino, keto, alkylamino (—NHR'), dialkylamino (—NR'R") or other groups known in the art. In the above examples, R' and R" can each, independently, be $C_1$ to $C_{18}$ alkyl, $C_1$ to $C_{18}$ alkoxy, $C_2$ to $C_{18}$ alkenyl, $C_2$ to $C_{18}$ alkynyl, $C_5$ to $C_{20}$ cycloalkyl, $C_5$ to $C_{20}$ aryl, $C_5$ to $C_{20}$ aryloxy, and the like. In certain embodiments, X may be substituted with one or more $C_1$ to $C_{18}$ alkyl, $C_1$ to $C_{18}$ alkoxy, $C_2$ to $C_{18}$ alkenyl, $C_2$ to $C_{18}$ alkynyl, $C_5$ to $C_{20}$ cycloalkyl, $C_5$ to $C_{20}$ aryl, $C_5$ to $C_{20}$ aryloxy, and the like, which may or may not be further substituted with a substituent such as those described above. For example, in some embodiments, one substituent associated with X may be an alkyl, alkoxy, aryl, or aryloxy group including one or more hydroxyl, halide, keto, amino, or other such substituent. In particular embodiments, X may be phosphonate and that is substituted at one or more carbon atoms with $C_1$-$C_{18}$ alkyl or $C_1$-$C_{18}$ alkoxy.

In further embodiments, the phosphorous containing component may be a compound of the general formula:

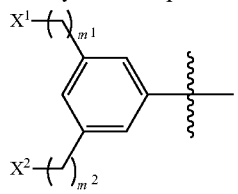

where $X^1$ and $X^2$ can, independently, be phosphine, phosphine oxide, phosphinite, phosphonite, phosphinate, phosphonate, or phosphate and $m^1$ and $m^2$ are, independently, an integer of 1 to 10. In some embodiments, each of $X^1$ and $X^2$ may be independently substituted at one or more positions with any of the substituents described above, and in certain embodiments, the substituent can, independently, be a $C_1$ to $C_{18}$ alkyl, $C_2$ to $C_{18}$ alkenyl, $C_2$ to $C_{18}$ alkynyl, $C_5$ to $C_{20}$ cycloalkyl, or $C_5$ to $C_{20}$ aryl. In particular embodiments, $X^1$ and $X^2$ may each be phosphonate and, independently, substituted within a $C_1$-$C_{18}$ alkyl. As such, in particular exemplary embodiments, the phosphorous containing component may be of formula:

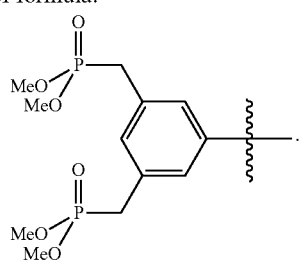

Embodiments of the invention are not limited particularly to methyl phosphonate as illustrated above. The methyl group may be replaced by any alkyl group.

In still other embodiments, B may be substituted at one or more positions with a non-phosphorous containing substituent. For example, in certain embodiments, the B may include one or more substituents including, but are not limited to, trifluoromethyl, nitro, cyano, $C_1$-$C_{20}$ alkyl, aromatic or aryl, halide (F, Cl, Br, I), $C_1$-$C_{20}$ alkyl ether, $C_1$-$C_{20}$ alkyl ester, benzyl halide, benzyl ether, aromatic or aryl ether, hydroxy, alkoxy, amino, keto, alkylamino (—NHR'), dialkylamino (—NR'R"), or other groups known in the art.

The lignin used in various embodiments may be derived from any source, and the lignin can be a naturally occurring polymer, a synthetically produced polymer, or a combination of these. For example, sources of lignin may include, but are not limited to, lignin sulfonates, Kraft lignins, soda lignins, organosolv lignins, softwood lignin, hardwood lignin, cellulosic grasses lignins, corn stover lignins, steam explosion lignins, or combinations thereof. As indicated above, the functional groups present on the lignin may vary depending on, for example, the source of the lignin. Certain functional groups may be more desirable than others depending on the specific chemical modification used to obtain the flame retardant. For example, in particular embodiments, the lignin modified may include a large number of hydroxyl groups. Each hydroxyl may be associated directly aromatic backbone, or in some embodiment, the hydroxyl may be associated with, for example, p-coumaryl alcohol, coniferyl alcohol, sinapyl alcohol, and derivatives or combinations thereof. The present invention is not limited to lignin obtained from specific sources.

A direct correlation can be made between the mass percentage of phosphorus atoms in a molecule and the resulting fire resistance. Phosphorous containing compounds when combined with hydrocarbons and burned convert carbon/oxygen rich material to a non-flammable "char" layer that coats un-burnt material. This "char" cuts the fuel supply to the flame, thereby inhibiting propagation of the flame and protecting the underlying composition.

The lignin compounds described herein must generally include a sufficient number of phosphorous containing components with sufficient regularity within the lignin to provide adequate "char." Additionally, particular applications may require varying degrees of flame retardancy, which could reduce the amount of phosphorous containing component necessary for sufficient flame retardancy in those specific applications. Therefore, the phosphorous content of the modified lignin of various embodiments may be about 0.1% to about 50% by weight of the lignin, or any value within this range, depending on the degree of flame retardancy required for a particular application. In some embodiments, the phosphorous content of the modified lignin embodied by the invention may be about 0.5 wt. % to about 40 wt. %, about 1 wt. % to about 35 wt. %, or about 5 wt. % to about 25 wt. %, or any value between these ranges. In still further embodiments, the phosphorous content of the modified lignin of the invention may be about 0.1 wt. %, about 0.5 wt. %, about 1 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, or any value there between.

Lignin modification can be performed by contacting or reacting a lignin with a phosphorous containing component. The skilled artisan can determine appropriate methods for preparing modified lignin such as the modified lignin described above, and the method used may vary depending on the type of lignin modified, the functional groups present on the lignin, the type of phosphorous containing component introduced onto the lignin, and the extent to which the lignin is modified. In various exemplary methods for preparing modified lignin, a lignin having free functional groups can be dissolved in an appropriate solvent and a phosphorous containing compound can be added to the solution to provide a reaction mixture. In some embodiments, a catalyst can be introduced into this reaction mixture.

During the reaction that occurs between the components of the reaction mixture, one or more free hydroxyl groups of the lignin are replaced with the phosphorous containing compound as illustrated in the reaction scheme below:

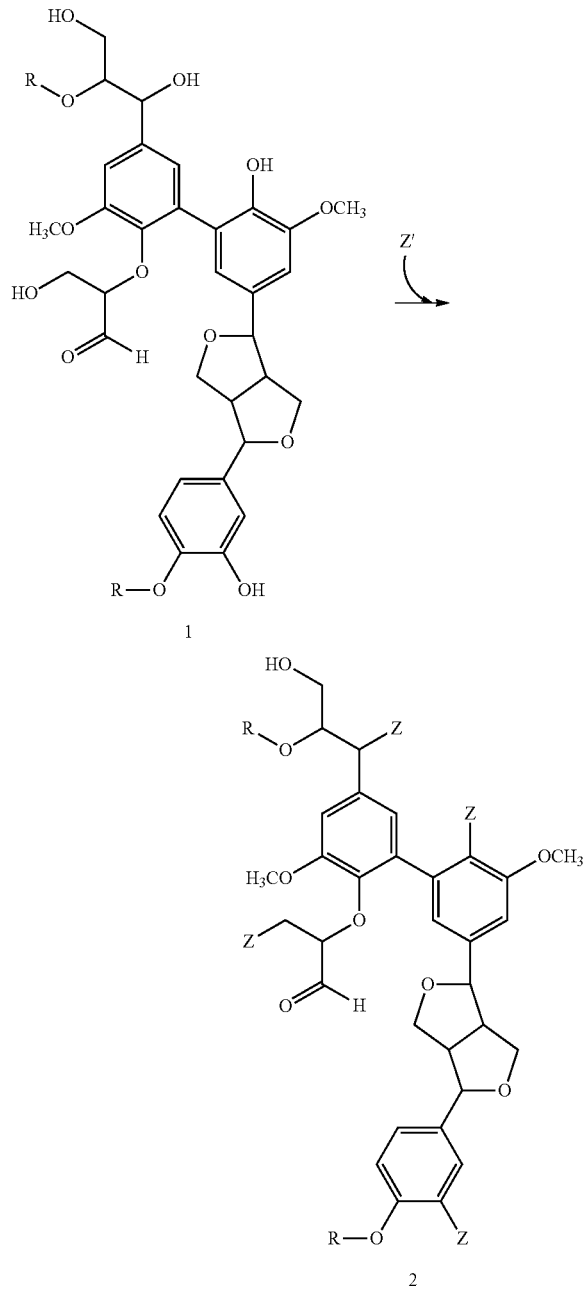

The reaction scheme presented above shows an exemplary lignin 1 that is reacted with a phosphorous containing component precursor Z' under conditions that allow the phosphorous containing component Z to be coupled to the lignin 1 through hydroxyls on the lignin 1 to produce a modified lignin 2. While the reaction scheme presented above shows the coupling of the phosphorous containing component a hydroxyl groups, in other embodiments, the phosphorous containing component may be coupled to the lignin 1 at, for example, carboxylic acid, keto, or other oxygen containing groups on the lignin 1.

Coupling can be carried out using any method known in the art. For example, in some embodiments, coupling between the phosphorous containing component Z and free hydroxyl groups on the lignin 1 can occur via Mitsunobu coupling. In such embodiments, a catalyst capable of inducing coupling of the phosphorous containing component and the lignin 1 can be introduced into a reaction mixture including the lignin 1 and a phosphorous containing pre-cursor. Suitable catalyst in such embodiments include, but are not limited to, triphenylphosphine, azopyridine, triphenylphosphine, diethyl azodicarboxylate, diisopropyl azodicarboxylate, and various combinations thereof. Depending on the choice of catalysts used, it may be possible to recover and recycle the catalysts after the reaction, allowing them to be used for multiple cycles.

In some embodiments, the lignin 1 may be dissolved in a polar non-protic solvent. The polar non-protic solvent is not limited. For example, in various embodiments, polar non-protic solvents may include, but are not limited to, dimethyl acetamide, nitromethane, acetonitrile, hexamethylphosphoramide, dimethylformamide, pyridine, 1,4-dioxane, N-methylpyrrolidone, sulfolane, 1-methyl-2-pyrrolidone, and the like and combinations thereof. In particular embodiments, the solvent may be dimethyl sulfoxide which is known to be an excellent solvent for lignin 1.

The phosphorous containing component precursor may vary among embodiments. For example, in some embodiments, the phosphorous containing component precursor may include a phosphorous moiety such as, for example, a phosphine, phosphine oxide, phosphinite, phosphonite, phosphinate, phosphonate, phosphate, or combinations thereof covalently attached to one or more $C_1$ to $C_{18}$ alkyl, $C_2$ to $C_{18}$ alkenyl, $C_2$ to $C_{18}$ alkynyl, $C_5$ to $C_{20}$ cycloalkyl, $C_5$ to $C_{20}$ aryl, or combinations thereof. In other embodiments, a phosphorous moiety such as those described above can include an additional moiety such as, for example, one or more $C_1$ to $C_{18}$ alkyl, $C_2$ to $C_{18}$ alkenyl, $C_2$ to $C_{18}$ alkynyl, $C_5$ to $C_{20}$ cycloalkyl, $C_5$ to $C_{20}$ aryl, or combinations thereof.

In particular embodiments, the phosphorous containing component precursor may be of general formula:

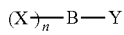

$$(X)_n\text{—B—Y}$$

where B can be a $C_1$ to $C_{18}$ alkyl, $C_2$ to $C_{18}$ alkenyl, $C_2$ to $C_{18}$ alkynyl, $C_5$ to $C_{20}$ cycloalkyl, or $C_5$ to $C_{20}$ aryl, each X can, independently, be phosphine, phosphine oxide, phosphinite, phosphonite, phosphinate, phosphonate, or phosphate, n is an integer of 2 to 8, and Y is a leaving group. In some embodiments, B can be a cycloalkyl or aryl group such as, but not limited to, cyclopentyl, cyclohexyl, cyclooctyl, cyclodecyl, cyclopentyl-diene, benzyl, naphthyl, indenyl, or combinations thereof, and in certain embodiments, B can be benzyl. In further embodiments, X can be substituted at one or more positions with a substituent that can, independently, be $C_1$ to $C_{18}$ alkyl, $C_2$ to $C_{18}$ alkenyl, $C_2$ to $C_{18}$ alkynyl, $C_5$ to $C_{20}$ cycloalkyl, or $C_5$ to $C_{20}$ aryl. In some embodiments, n may be 2, 3, or 4, and in particular embodiments, X may be phosphonate substituted with one or more $C_1$-$C_{18}$ alkyl. Y can be any leaving group known in the art. For example, Y may be hydroxyl, mesylate, tosylate, phosphite, ester, or chlorosulfite in various embodiments.

In certain embodiments, the phosphorous containing component precursor may be a compound of the general formula:

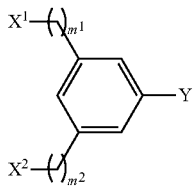

where each of $X^1$ and $X^2$ can, independently, be phosphine, phosphine oxide, phosphinite, phosphonite, phosphinate, phosphonate, or phosphate, $m^1$ and $m^2$ are, independently, an integer of 1 to 10, and Y is a leaving group. In some embodiments, each of $X^1$ and $X^2$ can independently, be substituted at one or more positions with a substituent that can, independently, be $C_1$ to $C_{18}$ alkyl, $C_2$ to $C_{18}$ alkenyl, $C_2$ to $C_{18}$ alkynyl, $C_5$ to $C_{20}$ cycloalkyl, or $C_5$ to $C_{20}$ aryl. In particular embodiments, $X^1$ and $X^2$ may each be phosphonate having one or more associated $C_1$-$C_{18}$ alkyl groups. For example, in some embodiments, the phosphorous containing component precursor may be of the formula:

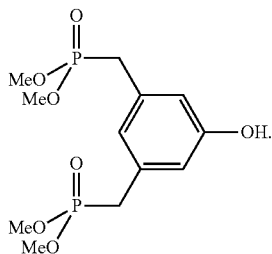 [SMILES: COP(=O)(Cc1cc(O)cc(CP(=O)(OC)OC)c1)OC]

The amount of phosphorous containing component precursor included in the reaction mixture may vary among embodiments, and may depend, for example, on the efficiency of the coupling reaction and the desired degree of flame retardancy. In some embodiments, the phosphorous containing component precursor may be about 0.1% to about 50% by weight of the reaction mixture. In other embodiments, the amount of phosphorous containing component precursor in the reaction mixture may be about 0.5 wt. % to about 40 wt. %, about 1 wt. % to about 35 wt. %, or about 5 wt. % to about 25 wt. %, or any value between these ranges. In still further embodiments, the amount of phosphorous containing component precursor in the reaction mixture may be about 0.1 wt. %, about 0.5 wt. %, about 1 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, or any value there between.

Following coupling the reaction may be terminated and the modified lignin 2 prepared may be purified away from the other components of the reaction mixture. Various methods for purifying lignin are known in the art and can be employed in embodiments of the invention. For example, in some embodiments, methods for preparing modified lignin 2 may include the steps of precipitating the modified lignin 2 and collecting a precipitated modified lignin 2. Precipitating may be carried out by contacting the reaction mixture with a protic liquid, such as, for example, water. Similarly, collecting the precipitate may be carried out by any method such as, for example, filtering the reaction mixture after precipitating, centrifugation of the precipitate lignin, heating to induce evaporation of the solvent, or combinations thereof.

In further embodiments, methods for preparing modified lignin 2 may include the steps of heating the precipitated modified lignin 2 in a dilute base. The step of heating may be carried out for any amount of time, but in certain embodiments, heating may be carried out for about 8 hours to about 24 hours. There is no limit on the type of base. For example, in various embodiments, the dilute base may be sodium hydroxide, potassium hydroxide, sodium bicarbonate, and the like, and the concentration of the base in the dilute base solution may be about 1 wt. % to about 5 wt. %, or any concentration between these values. In still other embodiments, methods for preparing modified lignin 2 may include neutralizing the pH of the precipitated modified lignin 2 containing solution by adding an acid to the reaction mixture. Embodiments are not limited to particular acids. For example, in various embodiments, neutralizing may be carried out by adding hydrochloric acid (HCl), sulfuric acid, nitric acid, or the like after the heating step. Generally, such acids can be at a concentration of 1 molar (M) or less, but any concentration can be used to effectuate neutralization.

In still further embodiments, methods for preparing modified lignin 2 may include the step of dehydrating the precipitated modified lignin 2. Dehydrating can be carried out by any method and can include further heating to remove solvent and water or dehydrating at ambient temperatures. In some embodiments, dehydrating may be carried out under vacuum.

Yet other embodiments may include the step of washing the precipitated modified lignin. Washing may be carried out at any time during the purification process, and one or more washing steps can be included either as simultaneous washing steps or intermittent washing steps between any of the steps of coupling, heating, neutralizing, or dehydrating as described above. Washing can be carried out using any solvent including ethanol, methanol, acetone, and the like, or water. In certain embodiments, simultaneous washing steps may be carried out with different solvents and/or water.

Further methods embodied by the invention include preparing fibers from the modified lignin 2. Such fibers can be prepared using any method. For example, in some embodiments, fibers may be prepared by spinning the dehydrated modified lignin 2. In other embodiments, fibers may be prepared by dissolving the modified lignin 2 in a solvent and spinning the modified lignin 2 into fibers. Such fibers may be used in numerous applications, including, for example, as a flame retardant in fabrics and insulation.

In other embodiments, the modified lignin 2 may be incorporated into polymers. For example, the modified lignin 2 may be incorporated into thermoset and thermoplastic engineering polymers such as, but not limited to, polycarbonates, epoxies, polyepoxies, benzoxazines, polyacrylates, polyacrylonitriles, polyesters, such as, poly(ethylene terephthalate), poly(trimethylene terephthalate), and poly(butylene terephthalate), unsaturated polyesters, polyamides, polystyrenes including high impact strength polystyrene, polyureas, polyurethanes, polyphosphonates, polyphosphates, poly(acrylonitrile butadiene styrene)s, polyimides, polyarylates, poly(arylene ether)s, polyethylenes, polypropylenes, polyphenylene sulfides, poly(vinyl ester)s, polyvinyl chlorides, bismaleimide polymers, polyanhydrides, liquid crystalline polymers, cellulose polymers, and the like and combinations thereof. The step of incorporating the modified lignin 2 into a polymer may be carried out by any means. For example, incorporating may be carried out by compounding, mixing, blending, or melt mixing the modified lignin 2 and the polymer.

In certain embodiments, the modified lignin 2 of the invention can undergo electrospinning to generate small fibers. In such embodiments, the modified lignin 2 can be dissolved in a solvent and spun into the thin fibers that can be incorporated into cloth, fabrics, filler materials for clothing, or insulation.

In particular embodiments, modified lignin 2 may be dissolved in an aprotic solvent such as dimethyl sulfoxide (DMSO) and contacted with a resin-bound triphenylphosphine/azopyridine. These modified Mitsunobu conditions avoid the traditional $PPh_3$/DEAD reagent set and allows for easy recovery and recycling of the catalysts post reaction. A rapid Mitsunobu coupling occurs, coupling the phosphorous containing component to the lignin at free hydroxyl groups. In some embodiments, if less flame retardancy is required, a stoichiometric amount of pyridine and the desired number of equivalents of diethyl chlorophosphate can be added to a DMSO solution of lignin. In such embodiments, a single phosphate will be coupled to available hydroxyl groups. After coupling, the resulting lignin/DMSO mixture can be poured into water, precipitating the lignin as a white solid. The powder is collected by filtration and heated in a dilute (1-5%) NaOH solution at 50-60° C. overnight, the pH is then neutralized with a mineral acid such as 1M HCl (aq). This generates modified lignin 2 that is flame retardant and has the necessary intramolecular attractions (hydrogen bonding between the lignin aldehydes/carboxylic acids and phosphoric acid) to provide the "stickiness" needed for fiber strength after electrospinning as well as successful blending into polymers as a flame-retardant filler.

The modified, flame-retardant lignin of various embodiments can be incorporated into numerous materials including, cloth, fabric, filler materials, and other flexible substrates. In other embodiments, the modified, flame-retardant lignin can be incorporated as a bulk powder into thermoplastics or thermosets. For example, the modified lignin 2 can be incorporated directing into epoxy resins or the modified lignin 2 can be incorporated into mats or cloths used to prepare epoxy laminates. The modified lignin 2 can be used alone as a flame retardant filler or reinforcement material, or in still other embodiments, the modified lignin 2 can be combined with non-flame retardant lignin, other flame retardant additives, other fillers, or other reinforcement materials. In such embodiments, unmodified, non-flame retardant lignin can be blended with the modified lignin 2 to lower the concentration of phosphonate groups and reduce filler costs.

The modified lignin 2 described herein above may be incorporated into a variety of articles of manufacture. Such articles of manufacture may include other fibers such as cotton, wool, polyester, or other commonly used fibers that are used to produce, for example, fabrics that are incorporated into clothing, draperies, upholstery, and other such articles. In other embodiments, the articles of manufacture may include a polymer into which the modified lignin 2 is incorporated. As discussed above, the polymer may be any thermoset or thermoplastic engineering polymer including, but are not limited to, polycarbonates, epoxies, derived polymers, polyepoxies, benzoxazines, polyacrylates, polyacrylonitriles, polyesters, such as, poly(ethylene terephthalate), poly(trimethylene terephthalate), and poly(butylene terephthalate), unsaturated polyesters, polyamides, polystyrenes including high impact strength polystyrene, polyureas, polyurethanes, polyphosphonates, polyphosphates, poly(acrylonitrile butadiene styrene)s, polyimides, polyarylates, poly(arylene ether)s, polyethylenes, polypropylenes, polyphenylene sulfides, poly(vinyl ester)s, polyvinyl chlorides, bismaleimide polymers, polyanhydrides, liquid crystalline polymers, cellulose polymers, or combinations thereof. Examples of articles of manufacture encompassed by the invention include, but are not limited to, coatings on plastics, metals, ceramic, or wood products, free-standing films, fibers, foams, molded articles, fiber reinforced composites, support parts, electrical components, electrical connectors, printed wiring laminated boards, housings, subcomponents and components, televisions, computers, laptop computers, printers, cell phones, video games, DVD players, and stereos.

Consumer electronics tend to produce significant heat and manufacturers are legally required to prepare articles of manufacture for electronics used to be flame retardant or have some flame resistant properties. Thus, many electrical and electronic appliances are coated by flame retardant materials in order to avoid the possibility of fire in case of a short-circuit or other similar failures in operation capable of producing a flame or a spark. As such, in certain embodiments, the polymers and fibers including the modified lignin 2 of embodiments may be used in electronics and electronic components.

EXAMPLE 1

Synthesis of the Phosphorous Containing Component 3,5-bis(bromomethyl)phenol can be protected with trimethylsilyl chloride through a well-known exchange reaction in which the trimethylsilyl group is substituted for the hydrogen on phenol portion of the 3,5-bisbromomethyl phenol. The 3,5-bis(bromomethyl)phenoxy)trimethylsilane produced is then refluxed briefly in neat trimethylphosphite to substitute a trimethylphosphite for each bromide followed by Arbuzov rearrangements to produce tetramethyl (5-(trimethylsilyoxy)-1,3-phenylene)bis(methylene)diphosphonate. The trimethylsilane portion of the molecule is then removed by adding a dilute acid such as dilute hydrochloric acid allowing mild hydrolysis to produce the tetramethyl (5-hydroxy-1,3-phenylene)bis(methylene)diphosphonate phosphonate containing component that can be introduced onto lignin.

EXAMPLE 2

Modification of Lignin

An excess of the phosphorous containing component prepared in Example 1 is dissolved in dimethyl sulfoxide (DMSO) and lignin is dissolved into this mixture. Resin-bound triphenylphosphine and azopyridine are added to this solution as catalysts. On addition of the catalysts, the free hydroxyl groups of the lignin are substituted by phosphorous containing groups via Mitsunobu coupling, producing the flame retardant material.

Adding water to the resultant mixture stops the coupling reaction and precipitates the material producing a white solid powder. This powder is collected by filtration and heated in dilute sodium hydroxide (NaOH) solution (5%) at 50° C. for 12 hours. An appropriate quantity of 1 M hydrochloric acid (HCl) is then added to neutralize the pH of the mixture. The final dry flame retardant powder is then obtained by dehydrating the resulting suspension.

EXAMPLE 3

Flame Retardant Felt

The dry flame retardant powder produced in Example 2 can be combined with 20 mM and 400 mM ammonium chloride solutions which rehydrate the lignin powder and allow the lignin suspension to flocculate. The flocculated lignin can then be extracted from the solution and washed with water to remove residual ammonium chloride. The fibrous material can then be formed into a felt by spreading the wet material onto a sheet and drying this sheet under heat. After drying a non-woven felt is formed that can be used to test flame retardancy.

A similar felt can be prepared using the same methodology with Kraft lignin powder purchased from a supplier that has not been modified to include the phosphorous containing component. Further felts can be produced that include mixtures of modified and unmodified lignin in which the modified lignin is provided at 25 wt. %, 50 wt. %, and 75 wt. %. Still further felts can be produced that include cotton and wool or cotton/wool blends combined with the modified lignin in which the modified lignin is provided at 25 wt. %, 50 wt. %, and 75 wt. %.

Test articles can be manufactured from the felts described above and flame retardancy can be tested using the National Fire Protection Association (NFPA), titled NFPA 701: Standard Methods of Fire Tests for Flame Propagation of Textiles and Films, methods. Under NFPA 701, the felt can be tested by burning a small sample and measuring the flame, char length, and flaming residue. The results of this testing should show that the felt including only modified lignin shows excellent flame retardancy producing small flames and some smoldering, with minimal charring, and leaving no flaming residue. In contrast, samples produced from unmodified lignin and cotton and cotton burn easily with heavy charring and flaming residue. Wool and cotton/wool blend materials burn less easily than the felt made with unmodified lignin and cotton, but burn, char, and produce some flaming residue. Flame retardancy should be improved by incorporating modified lignin into materials including unmodified lignin, cotton, wool, and cotton/wool blend material with fabrics meeting the NFPA 701 standards most likely being met at 50 wt. % or 75 wt. % modified lignin.

EXAMPLE 4

Flame Retardant Polymer

The dry flame retardant powder produced from Example 2 can be incorporated directly into a thermoplastic resin to improve flame retardancy of the polymer. Compositions can be produced that include 1 wt. %, 2 wt. %, 5 wt. %, 10 wt. %, 20 wt. %, and 40 wt. % flame retardant powder by introducing the flame retardant powder into a thermoplastic such as acrylonitrile butadiene styrene (ABS) and polyamide (PA or Nylon) using an extruder that has been heated to an appropriate melting temperature or melt mixing the materials in a mixer. The polymer compositions produced can be removed from the extruder or mixer and molded into test articles.

Testing for flame retardancy can be carried out using the limiting oxygen index (LOI) or UL-94 standards. Compositions including the modified lignin should show improved flame retardancy over test articles that do not include modified lignin. An LOI of about 20 and a V-0 rating will most likely be achieved at 10 wt. % or 20 wt. % modified lignin for both ABS and PA containing samples. Test articles can also be tested for notched impact strength, tensile strength and so on. High concentrations of modified lignin may negatively affect the toughness of the test samples, but at concentration of less than 20 wt. % the toughness should not be similar to samples including no lignin.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," and the like include the number recited and refer to ranges which can be subsequently broken down into subranges, as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A flame retardant comprising:
a lignin; and
a phosphorous containing component covalently bonded to the lignin, the phosphorous containing component comprising a compound of general formula:

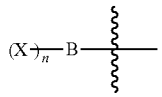

wherein:
B is $C_1$ to $C_{18}$ open-chain hydrocarbyl or $C_5$ to $C_{20}$ carbocyclyl;
each X is, independently, phosphine, phosphine oxide, phosphinite, phosphonite, phosphinate, phosphonate, or phosphate, and
n is an integer of 2 to 8.

2. The flame retardant of claim 1, wherein B is $C_1$ to $C_{18}$ alkyl, $C_2$ to $C_{18}$ alkenyl, or $C_2$ to $C_{18}$ alkynyl.

3. The flame retardant of claim 1, wherein B is $C_5$ to $C_{20}$ cycloalkyl, or $C_5$ to $C_{20}$ aryl.

4. The flame retardant of claim 1, wherein B comprises cyclopentyl, cyclohexyl, cyclooctyl, cyclodecyl, cyclopentyl-diene, benzyl, naphthyl, indenyl, or combinations thereof.

5. The flame retardant of claim 1, wherein:
each X is substituted at one or more positions with a substituent R, wherein each R is independently selected from a group consisting of $C_1$ to $C_{18}$ alkyl, $C_2$ to $C_{18}$ alkenyl, $C_2$ to $C_{18}$ alkynyl, $C_5$ to $C_{20}$ cycloalkyl, and $C_5$ to $C_{20}$ aryl;
the flame retardant comprises about 0.1 wt % to about 50 wt % of the phosphorous containing component; and
the lignin comprises lignin sulfonates, Kraft lignins, soda lignins, organosolv lignins, softwood lignin, hardwood lignin, cellulosic grasses lignins, corn stover lignins, steam explosion lignins, or combinations thereof.

6. The flame retardant of claim 1, wherein each X is independently

wherein:
Z is phosphine, phosphine oxide, phosphinite, phosphonite, phosphinate, phosphonate, or phosphate; and
m is an integer of 1 to 10.

7. The flame retardant of claim 6, wherein each Z is independently substituted at one or more positions with a substituent R, wherein R is independently selected from a group consisting of $C_1$ to $C_{18}$ alkyl, $C_2$ to $C_{18}$ alkenyl, $C_2$ to $C_{18}$ alkynyl, $C_5$ to $C_{20}$ cycloalkyl, and $C_5$ to $C_{20}$ aryl.

8. The flame retardant of claim 6, wherein B is $C_5$ to $C_{20}$ cycloalkyl, or $C_5$ to $C_{20}$ aryl.

9. The flame retardant of claim 6, wherein B comprises cyclopentyl, cyclohexyl, cyclooctyl, cyclodecyl, cyclopentyl-diene, benzyl, naphthyl, indenyl, or combinations thereof.

10. The flame retardant of claim 9, wherein each X is

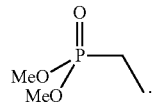

11. The flame retardant of claim 6, wherein B is $C_1$ to $C_{18}$ alkyl, $C_2$ to $C_{18}$ alkenyl, $C_2$ to $C_{18}$ alkynyl.

12. The flame retardant of claim 11, wherein each X is

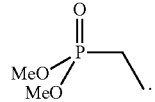

13. The flame retardant of claim 1, wherein each X is

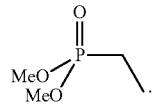

14. The flame retardant of claim 1, wherein the phosphorous containing component comprises a compound of general formula:

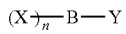

wherein Y is a leaving group.

15. The flame retardant of claim 14, wherein Y comprises hydroxyl, mesylate, tosylate, phosphite ester, or chlorosulfite.

16. The flame retardant of claim 15, wherein each X is

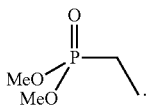

17. The flame retardant of claim 16, wherein B is $C_1$ to $C_{18}$ alkyl, $C_2$ to $C_{18}$ alkenyl, or $C_2$ to $C_{18}$ alkynyl.

18. The flame retardant of claim 16, wherein B is $C_5$ to $C_{20}$ cycloalkyl, or $C_5$ to $C_{20}$ aryl.

19. The flame retardant of claim 16, wherein B comprises cyclopentyl, cyclohexyl, cyclooctyl, cyclodecyl, cyclopentyl-diene, benzyl, naphthyl, indenyl, or combinations thereof.

20. A method for producing a flame retardant, the method comprising:
    producing a reaction mixture by contacting a lignin having free hydroxyl groups with a solvent and a phosphorous containing compound to form a covalent bond between the lignin and the phosphorous containing compound, wherein the phosphorous containing compound includes a compound of general formula:

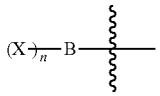

wherein:
    B is $C_1$ to $C_{18}$ open-chain hydrocarbyl or $C_5$ to $C_{20}$ carbocyclyl;
    each X is, independently, phosphine, phosphine oxide, phosphinite, phosphonite, phosphinate, phosphonate, or phosphate, and
    n is an integer of 2 to 8; and
    introducing a catalyst into the reaction mixture.

21. The method of claim 20, wherein producing the reaction mixture comprises contacting the lignin having free hydroxyl groups with the solvent and a phosphorous containing compound of general formula:

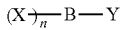

wherein Y is a leaving group.

22. The method of claim 20, wherein producing the reaction mixture comprises contacting the lignin having free hydroxyl groups with the solvent and a phosphorous containing compound of general formula:

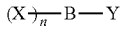

wherein Y comprises hydroxyl, mesylate, tosylate, phosphite ester, or chlorosulfite.

23. The method of claim 20, wherein producing the reaction mixture comprises contacting the lignin having free hydroxyl groups with the solvent and a phosphorous containing compound of general formula:

wherein:
    Y comprises hydroxyl, mesylate, tosylate, phosphite ester, or chlorosulfite;
    B is $C_1$ to $C_{18}$ alkyl, $C_2$ to $C_{18}$ alkenyl, $C_2$ to $C_{18}$ alkynyl, $C_5$ to $C_{20}$ cycloalkyl, or $C_5$ to $C_{20}$ aryl; and
    each X is independently

wherein:
    Z is phosphine, phosphine oxide, phosphinite, phosphonite, phosphinate, phosphonate, or phosphate; and
    m is an integer of 1 to 10.

24. The method of claim 23, wherein each X is

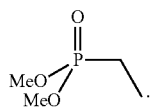

25. The method of claim 24, wherein:
    producing the reaction mixture comprises contacting the lignin having free hydroxyl groups with at least one solvent selected from dimethyl sulfoxide, dimethyl acetamide, 1,4-dioxane, 1-methyl-2-pyrrolidinone, pyridine, hexamethylphosphoramide, N-methylpyrrolidone, nitromethane, dimethylformamide, acetonitrile, sulfolane, or combinations thereof;
    introducing the catalyst comprises introducing at least one catalyst selected from azopyridine, triphenylphosphine, diethyl azodicarboxylate, diisopropyl azodicarboxylate or combinations thereof; and
    the method further comprises:
        adding water to the reaction mixture to produce a precipitant;
        filtering the precipitant from the reaction mixture;
        heating the precipitant in a dilute base comprising about 1 wt. % to about 5 wt. % solution of sodium hydroxide;
        adding an acid to the precipitant in the dilute base to neutralize the pH; and
        dehydrating the precipitant to form a flame retardant powder.

* * * * *